(12) United States Patent
Knapp et al.

(10) Patent No.: US 8,301,334 B2
(45) Date of Patent: Oct. 30, 2012

(54) WIRELESS VEHICLE TEST EQUIPMENT

(76) Inventors: Joshua P. Knapp, Dorr, MI (US);
Benjamin P. Knapp, Dorr, MI (US);
Emilo B. Fabregat, Portage, MI (US)

( * ) Notice: Subject to any disclaimer, the term of this patent is extended or adjusted under 35 U.S.C. 154(b) by 439 days.

(21) Appl. No.: 12/609,055

(22) Filed: Oct. 30, 2009

(65) Prior Publication Data
US 2010/0114425 A1   May 6, 2010

Related U.S. Application Data

(60) Provisional application No. 61/197,757, filed on Oct. 30, 2008.

(51) Int. Cl.
*G06F 19/00* (2006.01)
*G06F 7/00* (2006.01)

(52) U.S. Cl. ............ 701/31.5; 701/31.4; 701/33.2; 701/34.3; 701/34.4; 340/539.11; 340/539.16; 340/539.22; 340/539.24; 702/188

(58) Field of Classification Search ............ 280/86.75; 701/31.4, 31.5, 33.2, 33.3, 34.3, 34.4; 340/539.11, 340/539.1, 539.16, 539.22, 539.24, 679, 340/438; 702/188, 182–184
See application file for complete search history.

(56) References Cited

U.S. PATENT DOCUMENTS

| 4,381,548 | A  | * | 4/1983 | Grossman et al. | 701/32.1 |
| 6,442,460 | B1 | * | 8/2002 | Larson et al. | 701/32.6 |
| 7,536,278 | B2 | * | 5/2009 | Mian et al. | 702/184 |
| 7,557,696 | B2 | * | 7/2009 | Brinton et al. | 340/439 |
| 7,684,028 | B2 | * | 3/2010 | Willcock et al. | 356/213 |
| 7,769,508 | B2 | * | 8/2010 | Brozovich | 701/31.5 |
| 2005/0073435 | A1 | * | 4/2005 | Voeller et al. | 340/933 |
| 2005/0096805 | A1 | * | 5/2005 | Fudali et al. | 701/29 |
| 2005/0113991 | A1 | * | 5/2005 | Rogers et al. | 701/29 |
| 2005/0171662 | A1 | * | 8/2005 | Strege et al. | 701/33 |
| 2006/0173591 | A1 | * | 8/2006 | Knapp et al. | 701/33 |
| 2009/0024272 | A1 | * | 1/2009 | Rogers et al. | 701/33 |
| 2009/0177353 | A1 | * | 7/2009 | Braghiroli | 701/33 |

* cited by examiner

*Primary Examiner* — Ruth Ilan
(74) *Attorney, Agent, or Firm* — Clifford Kraft

(57) ABSTRACT

A system using a number of portable or wrist-worn remote controller units that communicate with a number of sensor units or sensor head sets for vehicle or automotive testing. An optional central communications controller can coordinate communications between the wrist-worn units and the sensor sets. A particular remote unit can associate with particular sensors or a particular sensor set and thus receive and transmit data only with that sensor set. Mechanics or technicians can run tests and take data completely from the remote units. The remote units generally contain a display screen that can show all parts and results of any vehicle test procedure. Various wireless communications techniques can be used to establish this communication.

12 Claims, 5 Drawing Sheets

WIRELESS VEHICLE TEST EQUIPMENT

This application is related to and claims priority from U.S. Provisional Patent application No. 61/197,757 filed Oct. 30, 2008. Application 61/197,757 is hereby incorporated by reference.

BACKGROUND

1. Field of the Invention

The present invention relates generally to the field of automotive or vehicle test equipment and more particularly to a system of wireless vehicle test equipment usable in multiple bays with no centralized test unit.

2. Description of the Prior Art

The typical vehicle test equipment system, and in particular the typical wheel alignment system uses a large cabinet (console) with a computer and display mounted inside or on top. This computer communicates with sensors that are mounted on the wheel of a vehicle in the case of a wheel alignment system. Each set of sensors is referred to as a "head". Various alignment modes allow for two or four heads. Some systems use a vision type system where the sensing is done at some distance from the wheels, and visual targets, instead of sensor heads, are mounted on the wheels of the vehicle. After mounting the heads to the wheels, the mechanic will go through several processes, some of these being optional, to setup the system. Processes include customer data entry, vehicle database selection for recall of specifications, runout compensation, caster swing, etc. Once these processes are performed, the mechanic can view the alignment information on the computer screen. Some systems allow for the option of a remote control/display device. This typically will allow the mechanic to view the alignment angles after the proper setup processes have been performed. This is helpful because sometimes it is difficult to have a clear line of sight to see the computer screen that is on the console, for example when a mechanic is working under a vehicle that is on a lift. One drawback of these remote control/display devices is that they are tied to a particular console unit.

Another drawback of the prior art is that each bay of a large facility needs to be equipped with a separate central test unit. This is expensive since it requires considerable duplication equipment.

It would be advantageous to have a system where there was no central console for each bay, only sensors and a local display/computer unit that could be worn on a mechanic's wrist or mounted in a convenient position. In a preferred mode, any wrist unit could communicate with any group of sensors (any head).

SUMMARY OF THE INVENTION

The present invention relates to a system containing a number of wrist-worn, (or otherwise portable), remote controller units that communicate with a number of sensor units or sensor head sets in a vehicle or automotive test environment. An optional central communications controller can coordinate communications between the wrist-worn units and the sensor sets. A particular remote unit can associate with a particular sensor set and thus logically receive and transmit data only with that sensor set in order to perform a test (with many communications systems, all units receive all transmissions, but only logically process transmissions intended for the particular station). Mechanics or technicians can run tests and take data completely from the remote units. The remote units generally contain a display screen that can show all parts and results of any vehicle test procedure. Various wireless communications techniques can be used to establish this communication.

DESCRIPTION OF THE FIGURES

Attention is drawn to several diagrams and illustrations that show features of the present invention.

Figure 1:
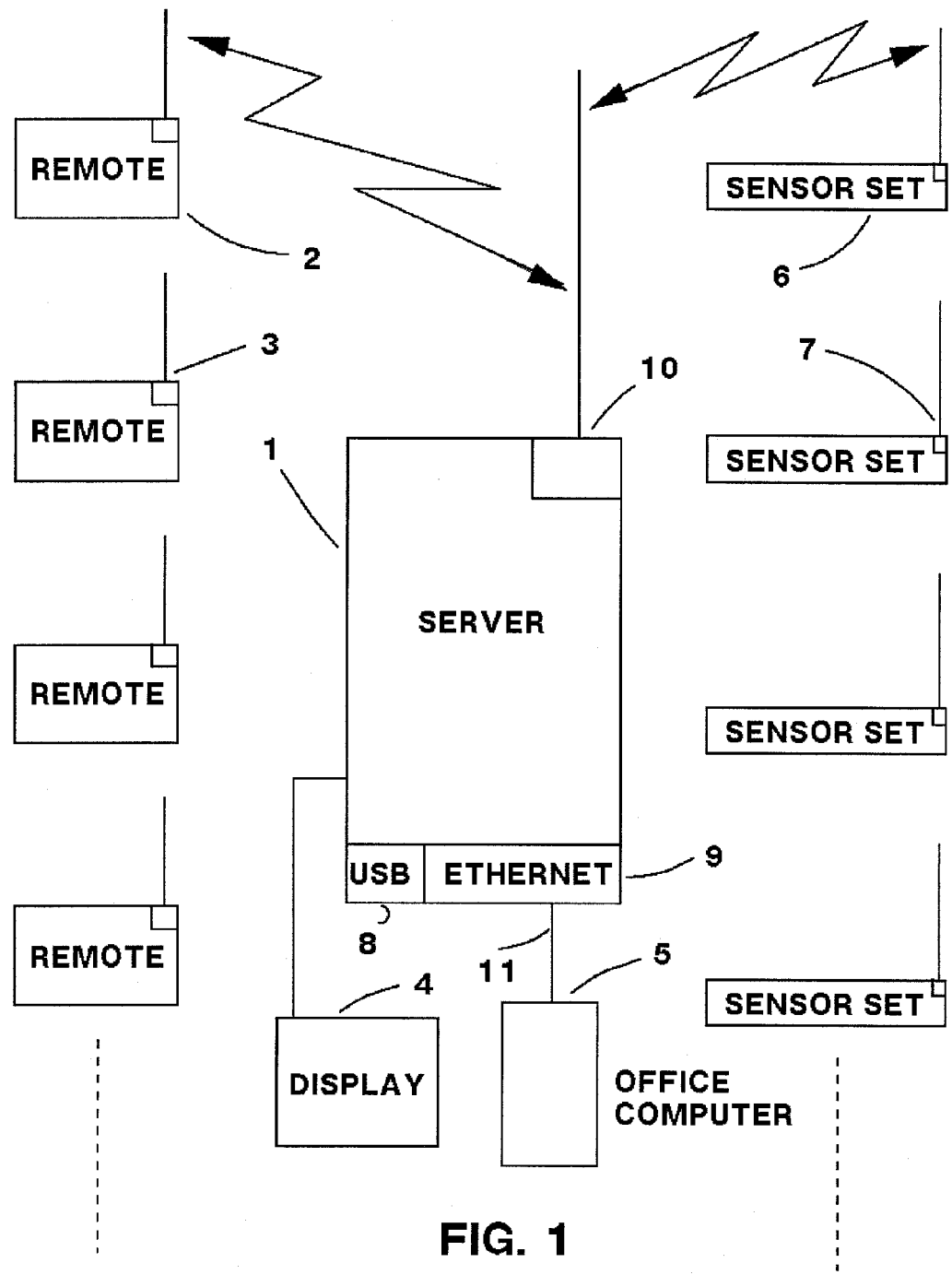
FIG. 1 shows a block diagram of an embodiment of the present invention.

Several drawings, diagrams and illustrations have been presented to aid in understanding the present invention. The scope of the present invention is not limited to what is shown in the figures.

DESCRIPTION OF THE INVENTION

The present invention allows an entire test procedure or entire wheel alignment procedure including vehicle selection, runout compensation and other tests to be performed completely on a wrist worn, or otherwise portable, remote unit. This allows for the elimination of the large console cabinetry.

The present invention relates to groups of wrist-worn or otherwise portable test units that contain processors that can wirelessly communicate with sets of sensors (or heads) that are attached to a vehicle during a test. The preferred embodiment of the present invention uses a master communications server that can coordinate communications between a large number of wrist units and a large number of sensors. This master communications server can also perform calculations based on the data from the sensors and maintain the state of each test procedure in progress. It is entirely within the scope of the present invention to eliminate this server and have wrist units and sensors communicate directly, perform all calculations, as well as maintain the test procedure state.

Optionally, each wrist worn remote unit can control any number of sets of alignment heads or test sensors. Usually some limit is imposed for practical reasons such as programming, storage and bandwidth. A limit of 5 sets of heads and 5 wrist worn controllers is entirely practical; however, any other limit may be set; in fact, this limit could be much higher if needed. The sets of heads can be color-coded, for example red, green, yellow, gray and black for a shop with 5 sets of heads.

The following is an example of how the present invention can be used in a shop with several bays for the case of wheel alignment: An alignment shop could purchase 3 sets of alignment heads and 5 wrist worn controllers. Each of 5 mechanics could then have their own personal wrist worn controller. Each mechanic has the ability to connect to any of the 3 sets of heads (or some other number). The mechanic will turn on his wrist worn controller and select which set of heads he would like to use from the available sets. A set of heads is unavailable if it is currently in use, or if it doesn't exist. In this case the set is shown to be not available on the wrist worn controller. Once the mechanic selects a set of heads, his wrist unit is considered to be associated with that set. As a result, all data pertinent to that set of heads will be made available to this wrist unit, and all alignment head commands from that wrist unit will be directed to that set of heads. This association lasts until either the mechanic finishes the alignment procedure, the mechanic "releases" the set, or there's been no activity from the mechanic's wrist unit for a predetermined period of time. The latter case covers situations where the wrist unit is damaged, or its battery goes dead. This allows for automatic release so that either batteries can be replaced, or another wrist unit can be used to resume the alignment. The state of the alignment can be maintained by a central communications server for this case.

Turning to FIG. 1, a block diagram of an embodiment of the present invention can be seen. A central communications server 1 can contain a wireless link 10 that includes a transceiver and an antenna. The central server can also have a USB port 8, an Ethernet port 9, an optional display 4 and an optional link 11 to a printer or service writer computer 5. Typically a remote printer or service writer 5 communicates with the Ethernet port 9 on the central communications server 1. The central communications server 1 can be a node on a much larger network if desired, including a network of such communication servers.

A number of wrist-worn or otherwise portable remote controllers 2, each with a wireless link 3 having a transceiver and an antenna can communicate with the central communication controller 1. In addition, a number of sensor sets 6, each with a wireless link 7 including a transceiver and an antenna also can communicate with the central controller 1.

Figure 2:
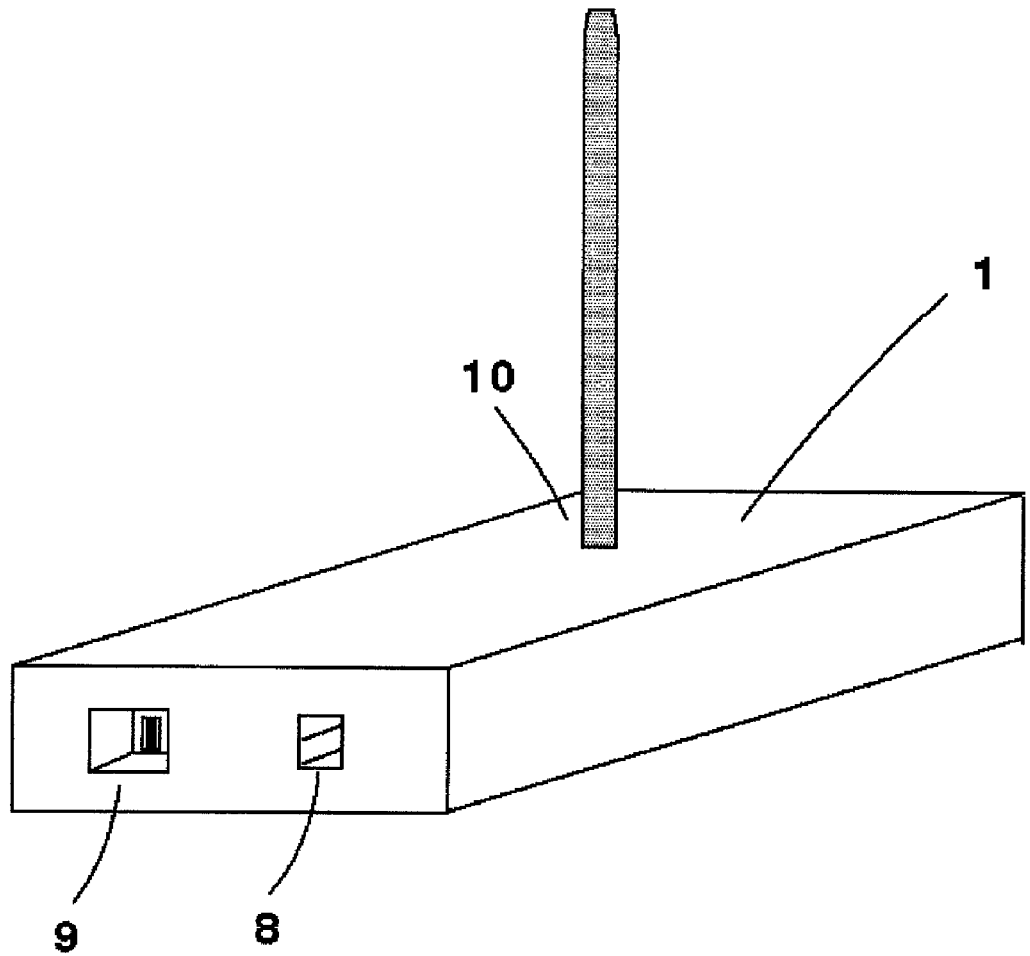
FIG. 2 shows an embodiment of a central communications sever or controller.

FIG. 2 shows an embodiment of a central communications server. This particular embodiment also has a display. This server orchestrates the communications between all wrist-units and all sets of heads. As previously stated, it is possible to perform all of the functions without a central communications server, but it is easier to manage system operations by using a central server. Also because a central server generally reduces processing requirements on the wrist worn or portable remote controllers, it is possible to keep the remote controllers simpler and more economical and possibly to use less power (thereby prolonging battery life).

Figure 3:
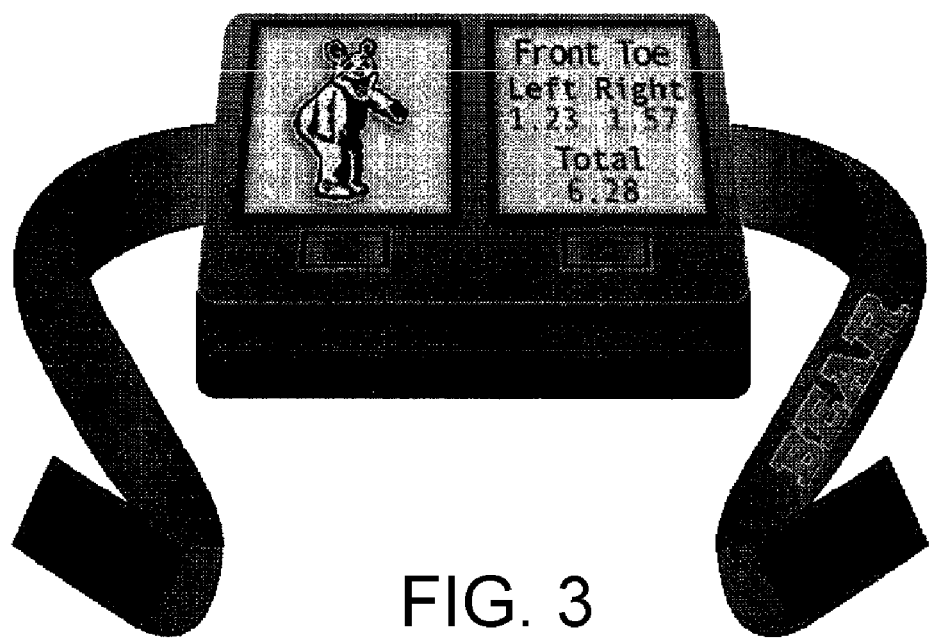
FIG. 3 shows a wrist-worn or otherwise portable remote unit.

FIG. 3 shows an embodiment of a wrist-worn unit or otherwise portable remote unit. This wrist-worn remote unit, in addition to have a wireless interface 3 can also contain a processor, memory, display, buttons or controls and optional input/output ports such as Ethernet or USB if desired. The remote unit generally contains batteries to power the processor and its display. The portable unit does not need to be wrist-worn. It can optionally be supplied with a clip or flexible bracket or a magnet or suction cup so that the mechanic an slide the remote into or onto this clip or bracket to temporarily mount it onto the vehicle or an alignment or other working rack if desired. This is a desirable feature since some mechanics may want both of their hands free or high over their heads while making an adjustment. In this position, it might be difficult to see the screen of a wrist-worn unit. In the present description of the invention, the term "wrist-worn" can mean "portable" or "mountable" in any way and does not imply that the unit has to be worn by the mechanic or that it has to be worn on the wrist.

FIGS. 4A-4I show particular screens that can be displayed on a wrist-worn test unit for the case of a wheel alignment system.

Figure 4A:
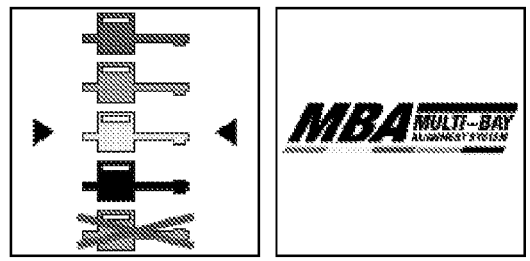
FIGS. 4A-4I show various screens that can be displayed on a remote unit.

FIG. 4A shows a wheel unit set association screen. The user can cycle through the different colored icons to choose the sensor set they want to use. The last icon shows a slash through it. This indicates that the particular sensor set is either in use or otherwise not available.

Figure 4B:
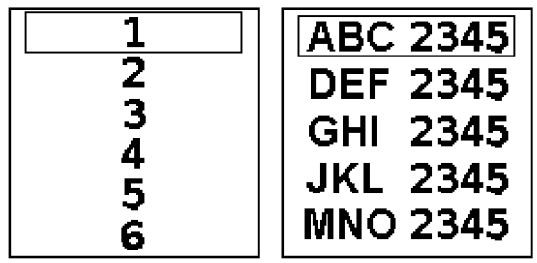

FIG. 4B shows a work order selection screen for selecting a particular vehicle to work on. The work order is on the left, and a list of license plates it on the right.

Figure 4C:
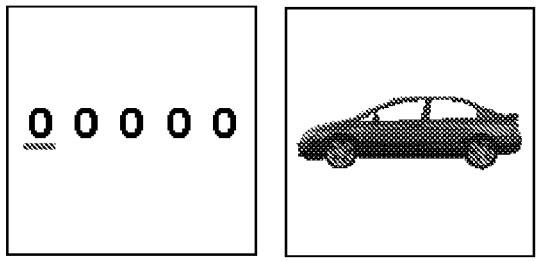

FIG. 4C shows an optional vehicle specification number. A screen like this can be used to enter a specification number or other identifier which will cause the remote unit to receive particular specifications. If the information has already been received or is otherwise in the remote unit.

Figure 4D:
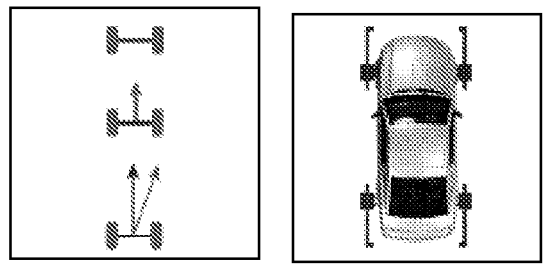
Figure 4E:
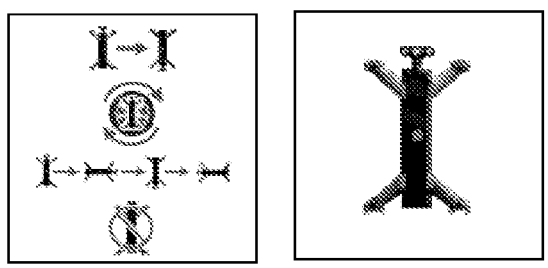
Figure 4F:
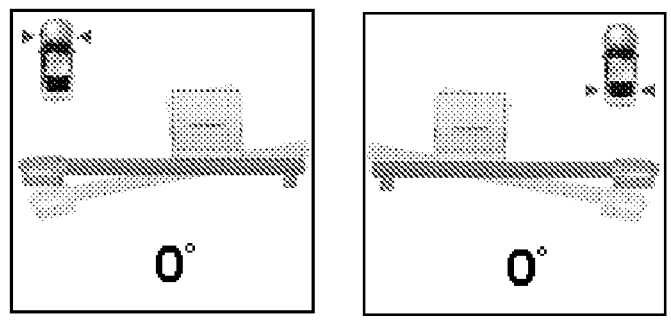
Figure 4G:
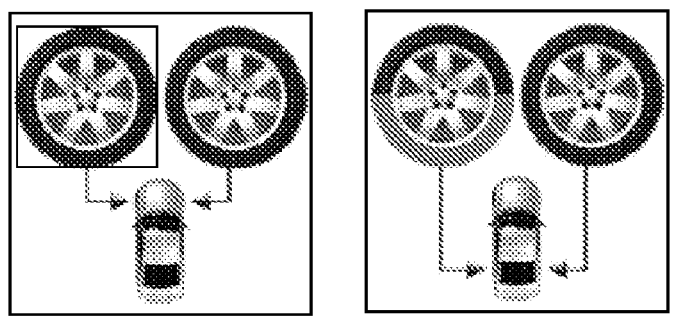
Figure 4H:
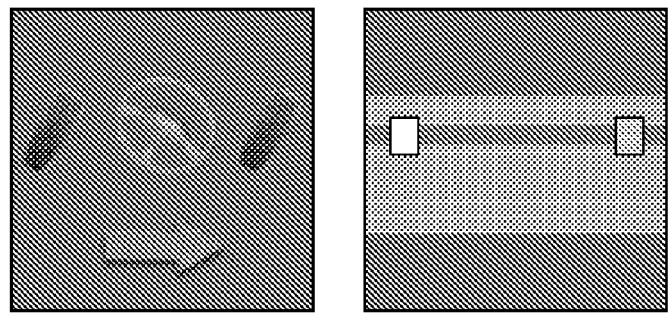
Figure 4I:
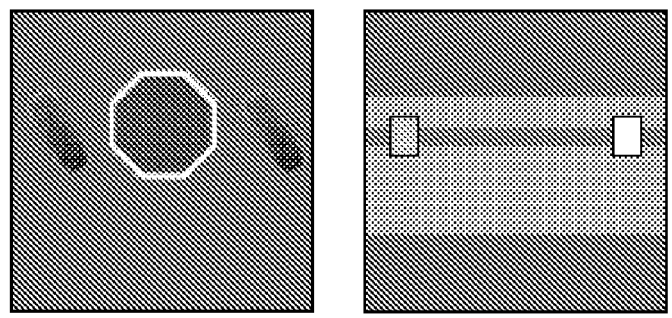

FIGS. 4D-4I show special screens that might be used in a wheel alignment system. FIG. 4D shows an alignment mode selection screen. FIG. 4E shows a runout mode screen, while FIG. 4F shows a wheel unit tilt entry screen. FIG. 4G shows a runout procedure screen while FIGS. 4H-4I show caster swing procedure screens.

It should be noted that all of the screens shown in FIGS. 4A-4I relate primarily to wheel alignment systems and are optional. Each could be changed to reflect any type of testing or job being performed.

Many communications schemes can be used that would allow implementation of the concepts of the present invention including radio, light, sound and any other wireless technique. The preferred technique is radio. Each wrist worn remote controller, each head, and each communications server module can be outfitted with a wireless transceiver that conforms to the Institute for Electrical and Electronic Engineers (IEEE) 802.15.4 standard or other wireless communications standard. All units, regardless of type, typically share a single Personal Area Network ID (PAN). This PAN ID allows the transceivers to use a low-level protocol to identify packets that belong to the personal area network. If a received packet belongs to the PAN its encapsulated message is allowed to pass from the radio to the rest of the circuitry. This message includes a destination field. Each of the remotes, each of the heads, and the server can be individually addressed by this field. Various broadcast destinations are allowed as well (to everyone in the system, to each remote, to all heads, and to all the heads in a particular set). The server generally is powered 24 hours a day. When the server powers up its transceiver will select a clear channel that is not being used by any other devices in proximity. When the heads and remote controls are powered up they will scan channels "looking" for a matching PAN ID. Once this match is found the units will utilize this channel for communications.

An important feature of the present invention is that all state information relating to a testing or alignment process can be maintained by the central communications controller or these states can be distributed in the system by being stored at each remote unit or at any other convenient location in the system such as in the sensor sets. If power is lost to one or more remote units, the whole process can be continued from where it was left off without having to repeat the entire process. In some embodiments of the invention, any other remote unit can take over the testing that was in process when the failure occurred.

During installation of a particular test system, it may be discovered that another device in the area is using the PAN ID desired by the system being set up. A method of changing the factory default PAN ID found in most transceivers is thus necessary. This can be accomplished in many ways. Since the wrist-worn remote control devices have a display and push-buttons, menu selections on the display can allow for changing the PAN ID. The server module and the heads pose a different problem because they do not have a similar user interface. To get around this problem, the server's PAN ID can be set by two methods. One is to place a particular file on a USB memory stick. The content of this file can include the PAN ID. When the server module is booted, it will search for this file. If it exists, and if the PAN ID is different than the currently stored ID, the server will change the PAN ID to match the PAN ID indicated in the file. A second method of changing the PAN ID on the server is by using the connection to optional office computer. A maintenance screen on the office computer can simply send a message (via an Ethernet or other connection) indicating that the PAN ID should be updated and what the new PAN ID is.

It is possible to include switches on the circuit boards within the heads, or to provide a keypad with a display, or to include a special communications port on the head in order to facilitate changing the PAN ID on the heads. However these methods have the drawbacks of cost and complexity for the person trying to setup the system. The preferred method of the present invention uses a push button switch mounted on the sensor circuit board. This switch can be located over a hole in the sensor case so that a paper clip or pin etc. can be pushed through the hole to engage the switch. After the server module's PAN ID is established, the button on a head can be pressed. This causes the head to instruct its radio to perform a scan for active PAN IDs in the area. Each of the active PAN IDs is then queried for a Destination Node that has a Node Identifier that is particular to server modules. If a positive response is received then the head saves the current PAN ID. The same result can be achieved with less capable radios (though not as quickly and efficiently) by searching through all PAN IDs on all channels (or a designated subset of both). Search methods can include a direct query to the server module or passive listening for valid traffic.

In the case of replacing a circuit board within a head it is usually necessary to configure the set and head identifiers. The set and head identifiers of an alignment head can generally be configured by pushing a button. This can be the same button as is used to set the PAN ID. An example procedure might be as follows. The user views a maintenance screen generated by the server using a PC (an installer may use their laptop if they wish). The screen instructs the user to push the button on the desired head. When the button is pressed the head is put into a mode (which could be time limited in case of accidental activation) in which it will monitor for and act on a special broadcast message from the server module which configures the proper identifiers. The user then enters into the maintenance screen the desired set and head identifiers for the unit whose button was pushed. The server broadcasts these identifiers, and upon receiving them, the head then exits the identifier setup mode. At this point, the process could be repeated for other heads.

While having a display on the central communications server console is completely optional with the current invention, an optional display unit could be used to show information that is too detailed to show on a remote unit. For example, mechanical drawings that show the mechanic how to make adjustments or run tests could be displayed. In this case, different mechanics could share this resource. Since mechanics less often use adjustment drawings, they would not normally be displayed. If a mechanic wanted a particular drawing, he or she could simply walk up to a common area where the server was located, select the correct drawing from a menu. Alternatively, the drawing could be selected from the wrist-worn unit. For drawings small enough to display on the wrist-worn unit, the server could download the correct drawing to the wrist-worn unit. The mechanic could view the drawing by simply pushing a button on the unit.

Several descriptions and illustrations have been presented to aid in understanding the features of the present invention. One skilled in the art will realize that numerous changes and variations can be made without departing from the spirit of the invention. Each of these changes and variations is within the scope of the present invention. Also, several examples of practical implementations and embodiments of the present invention have been presented for clarity. The scope of the present invention is not limited to what is described in the examples.

We claim:

1. A vehicle test system comprising:
a plurality of remote test units, each of said test units containing a processor, a memory, a battery, a display and a wireless transceiver;
a plurality of vehicle test sensors or test sensor sets, each of said test sensors or test sensor sets containing at least a wireless transceiver;
wherein said remote units communicate wirelessly with said sensors or sensor groups causing said sensors or sensor groups to perform vehicle tests and wherein said remote test units display data from said sensors or sensor groups;
a central communications server coordinating communications between said remote test units and said test sensors or sensor sets,
wherein at least some of said remote test units are wrist-worn;
and wherein a particular remote test unit can choose to form an association only with a particular group of sensors or test sensor sets and can release said association upon completion of a testing session.

2. The vehicle test system of claim 1 wherein said test system is a wheel alignment system.

3. The vehicle test system of claim 1 wherein said test sensor sets are alignment heads.

4. The vehicle test system of claim 1 wherein said communication is by radio.

5. The vehicle test system of claim 1 wherein a particular remote test unit is constrained to communicate only with a particular group of sensors or sensor sets.

6. The vehicle test system of claim 1 wherein a particular remote test unit can choose to communicate only with a particular group of sensors or a particular sensor set.

7. The vehicle test system of claim 6 wherein said particular remote test unit displays a particular message or icon when said particular group of sensors or particular sensor set is in use or unavailable.

8. A wireless wheel alignment system comprising:
a plurality of wrist-worn test units, each of said test units containing a processor, memory, display, battery and wireless communication module;
a plurality of sensor sets, each of said sensor sets including a wireless communication module;
a central communication server capable of wireless communication with said plurality of wrist-worn test units and with said plurality of sensor sets wherein said central communication server coordinates wireless communication between particular wrist-worn test units and particular sensor sets.

9. The wireless wheel alignment system of claim 8 wherein said display in each of said wrist-worn test units displays test data from a particular sensor set.

10. The wireless wheel alignment system of claim 8 wherein a particular wrist-worn test unit can select to communicate only with a particular sensor set.

11. The wireless wheel alignment system of claim 10 wherein said wrist-worn test unit will display a unique message or icon if said particular sensor set is in use or unavailable.

12. The wireless wheel alignment system of claim 8 wherein said wireless communication is by radio.

* * * * *